US011133560B2

(12) United States Patent
Li et al.

(10) Patent No.: US 11,133,560 B2
(45) Date of Patent: Sep. 28, 2021

(54) INSULATING TAPE AND LI-ION BATTERY ADOPTING THE SAME

(71) Applicant: Dongguan Amperex Technology Limited, Dongguan (CN)

(72) Inventors: Benzhen Li, Dongguan (CN); Qingfeng Yuan, Dongguan (CN)

(73) Assignee: DONGGUAN AMPEREX TECHNOLOGY LIMITED, Dongguan (CN)

( * ) Notice: Subject to any disclaimer, the term of this patent is extended or adjusted under 35 U.S.C. 154(b) by 24 days.

(21) Appl. No.: 15/423,366

(22) Filed: Feb. 2, 2017

(65) Prior Publication Data
US 2017/0222204 A1 Aug. 3, 2017

(30) Foreign Application Priority Data

Feb. 2, 2016 (CN) .......................... 201610072552.2

(51) Int. Cl.
*H01M 50/446* (2021.01)
*H01M 10/0525* (2010.01)
(Continued)

(52) U.S. Cl.
CPC .............. *H01M 50/446* (2021.01); *B32B 9/04* (2013.01); *H01M 50/449* (2021.01); *H01M 10/0525* (2013.01)

(58) Field of Classification Search
CPC .... H01M 10/0525; H01M 2/16; H01M 2/166; H01M 2/1686; H01M 50/446
See application file for complete search history.

(56) References Cited

U.S. PATENT DOCUMENTS 9,281,509 B2 * 3/2016 Sano ....................... B32B 23/08
2010/0247991 A1 * 9/2010 Hosokawa ........ H01M 10/0436
429/94

(Continued)

FOREIGN PATENT DOCUMENTS

CN 101006595 A 7/2007
CN 201838641 U 5/2011
(Continued)

OTHER PUBLICATIONS

Chinese Office Action dated May 2, 2017 for corresponding Chinese Patent Application No. 201610072552.2 and English translation thereof.

(Continued)

*Primary Examiner* — Karie O'Neill Apicella
(74) *Attorney, Agent, or Firm* — Tarolli, Sundheim, Covell & Tummino LLP

(57) ABSTRACT

The present application relates to the field of energy storage devices and, particularly, relates to an insulating tape and a Li-ion battery adopting the same. The tape includes a substrate, a hard particle layer and an adhesive layer; the substrate is of a microporous structure, the hard particle layer is stacked on the surface of the substrate, and the particle diameter of the particles of the hard particle layer is greater than the pore diameter of the microporous structure of the substrate, the adhesive layer and the hard particle layer are compositely arranged or separately arranged, the adhesive layer is stacked on a side of the hard particle layer far away from the substrate. The Li-ion battery includes the insulating tape. The Li-ion battery provided by the present application reduces the influence on energy loss of the cell caused by the arrangement of the insulating tape.

8 Claims, 1 Drawing Sheet

(51) Int. Cl.
*B32B 9/04* (2006.01)
*H01M 50/449* (2021.01)

(56) References Cited

U.S. PATENT DOCUMENTS

| | | | | | |
|---|---|---|---|---|---|
| 2010/0279173 | A1* | 11/2010 | Hying | ............ | H01M 2/162 |
| | | | | | 429/247 |
| 2014/0072864 | A1 | 3/2014 | Suzuta et al. | | |
| 2014/0322587 | A1* | 10/2014 | Lai | ............ | H01M 2/166 |
| | | | | | 429/145 |
| 2015/0333308 | A1* | 11/2015 | Toyoda | ............ | H01M 2/145 |
| | | | | | 429/144 |

FOREIGN PATENT DOCUMENTS

| | | |
|---|---|---|
| CN | 103484032 A | 1/2014 |
| JP | 2013093182 A | 5/2013 |

OTHER PUBLICATIONS

Chinese Office Action for corresponding Chinese Application Serial No. 201610072552.2, dated Jan. 2, 2018, pp. 1-13.

* cited by examiner

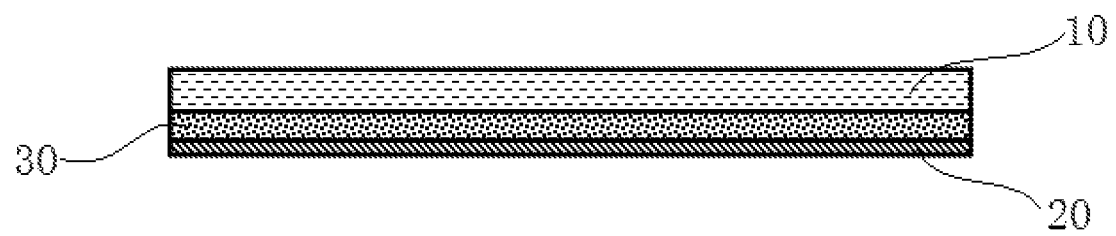

INSULATING TAPE AND LI-ION BATTERY ADOPTING THE SAME

CROSS-REFERENCE TO RELATED APPLICATIONS

The present application claims priority to Chinese Patent Application No. 201610072552.2, filed on Feb. 2, 2016, the content of which is incorporated herein by reference in its entirety.

TECHNICAL FIELD

The present application relates to the field of energy storage devices and, particularly, relates to an insulating tape and a Li-ion battery adopting the insulating tape.

BACKGROUND

It is well known in the art that the insulating tape is an auxiliary material for the Li-ion battery, which is usually used at the welding area of cell tabs, overhanging positions of the cathode and anode, and positions corresponding to the cross sections, the main purpose of which is to prevent the burr from penetrating the diaphragm and causing short circuit and failure of the cell. Particularly, the area of the anode (or negative electrode) coating material corresponding to the cathode (or positive electrode) current collector (e.g. Al foil) must be insulated, otherwise it will increase the risk of short circuit inside the cell. In the meantime, in order to guarantee that the area of the anode corresponding to the cathode current collector is well insulated, a certain area of the cathode coating material generally needs to be adhered with the insulating tape.

However, in the related art, for example, patent ZL201020275410.4 provides an insulating tape for the Li-ion battery, which adopts PE, PP or PI as the substrate, and a plurality of through holes with a diameter of 20~50 µm are evenly provided on the substrate, so as to facilitate electrolyte exchanging and gas exhausting, thereby reducing the influence of the insulating tape on energy loss of the cell.

In order to achieve better insulating blocking effect, the integral thickness of the insulating tape is relatively thick. However, a thicker insulating tape itself occupies more internal space of the cell, even though the plurality of through holes are provided, the caused energy loss of the cell is still huge.

SUMMARY

The present application provides an insulating tape and a Li-ion battery adopting the insulating tape, which can reduce energy loss of the cell.

A first aspect of the present application provides an insulating tape, including a substrate, a hard particle layer and an adhesive layer;

the substrate is of a microporous structure, the hard particle layer is stacked on a surface of the substrate, and a particle diameter of a particle of the hard particle layer is greater than a pore diameter of the microporous structure of the substrate, the adhesive layer and the hard particle layer are compositely arranged.

A second aspect of the present application provides an insulating tape, including a substrate, a hard particle layer and an adhesive layer;

the substrate is of a microporous structure, the hard particle layer is stacked on a surface of the substrate, and a particle diameter of a particle of the hard particle layer is greater than a pore diameter of the microporous structure of the substrate, the adhesive layer and the hard particle layer are separately arranged, the adhesive layer is stacked at a side of the hard particle layer far away from the substrate.

Preferably, the microporous structure is a porous membrane structure, a non-woven fabric structure or a sponge structure.

Preferably, a porosity of the microporous structure is 35~55%.

Preferably, a thickness of the substrate is 3~16 µm.

Preferably, the hard particle layer is a ceramic particle layer.

Preferably, when the adhesive layer and the hard particle layer are separately arranged, the ceramic particle layer includes $Al_2O_3$ ceramic particles and a binder.

Preferably, a material of the adhesive layer is polyvinylidene fluoride, vinylidene fluoride-hexafluoropropylene copolymer, polyamide, polyacrylonitrile, polyacrylate, polyacrylic acid, polyacrylic acid salt, sodium carboxymethyl cellulose, styrene-butadiene polymer, polyvinyl pyrrolidone or poly (methyl methacrylate).

Preferably, a material of the substrate is one selected from PE, PP and PI or a composite formed by at least two of PE, PP and PI.

A third aspect of the present application provides a Li-ion battery, including any one of the above-mentioned insulating tapes.

The technical solutions provided by the present application can achieve the following beneficial effect:

The Li-ion battery provided by the present application, by adopting the substrate with the microporous structure and the insulating tape with the hard particle layer, in one aspect, can effectively prevent the burr from penetrating by using high hardness property of the hard particle layer and reduce the integral thickness of the tape, in another aspect, can also enable the interior of the substrate to store more electrolyte through the microporous structure, so as to improve the energy density of the cell. Therefore, the influence of the arrangement of the insulating tape on energy loss of the cell is reduced.

It should be understood that, the general description above and the following detailed description are merely exemplary, which shall not limit the present application.

BRIEF DESCRIPTION OF DRAWINGS

FIG. 1 is a structural schematic diagram of an insulating tape provided by Embodiment 1 of the present application.

REFERENCE SIGNS

10—substrate;
20—hard particle layer;
30—adhesive layer.

The accompanying drawing herein is incorporated in the description and constitutes a part of the description, which illustrates the embodiment in accordance with the present application, and is used to explain the principle of the present application together with the description.

DESCRIPTION OF EMBODIMENTS

The present application will be illustrated in further detail through specific embodiments with reference to the accompanying drawings. The words "front", "back", "left", "right", "top" and "bottom" mentioned in the disclosure are all referring to the placement state of the insulating tape and the Li-ion battery adopting the insulating tape.

As shown in FIG. 1, Embodiment 1 of the present application provides an insulating tape, including a substrate 10, a hard particle layer 20 and an adhesive layer 30. The substrate 10 is the main structure of the whole insulating tape, which carries the hard particle layer 20 and the adhesive layer 30. In the meantime, the substrate 10 provided by the present embodiment is of a microporous structure, both the surface and the interior of which are distributed with a large number of irregular micropores. Such a microporous structure therefore enables the substrate 10 to have good permeability and wettability. In one aspect, the gas and electrolyte can be transferred through these microporous structures from the surface of one side to the surface of another side of the substrate 10, more importantly, the a large amount of electrolyte can exist in the interior of the substrate 10 due to this kind of microporous structure, and compared with the substrate structure of the insulating tape in the related art, the substrate 10 of this kind of microporous structure brings much less influence on the energy loss of the cell.

The microporous structure of the substrate 10 can be similar to the existing porous membrane structure, non-woven fabric structure or sponge structure. Its manufacturing method can also follow the conventional manufacturing methods of existing various structures. For example, the manufacturing method disclosed in Chinese patent application No. 201410131516.X or 201080052100.9 can be adopted to manufacture the polyolefin porous membrane. Further, an electrospinning preparing method for a Li-ion battery diaphragm of high performance poly(aromatic ether) resin disclosed in Chinese patent application No. 200910011641.6 can be adopted to manufacture high performance poly(aromatic ether) non-woven fabrics. In order to achieve better strength and higher capacity, the porosity of the substrate 10 can be maintained within the range of 35~55%. The material of the substrate can adopt a single component, such as PE (polyethylene), PP (polypropylene) or PI (polyimide), or a composite of two or more thereof. The thickness of the substrate 10 can vary within the range of 3~16 μm according to the difference of the selected material, microporous structure and hard particle layer 20.

In the present embodiment, the structural strength of the substrate 10 is reduced due to the adoption of the microporous structure, which cannot satisfy the performance requirement for preventing the burr from penetrating, therefore, the present embodiment also provides the hard particle layer 20. The hard particle layer 20 is stacked on the surface of the substrate 10 and is composed of a large number of hard particles, and the particle diameter of each of these particles is greater than the pore diameter of the microporous structure of the substrate 10, so as to prevent these hard particles from blocking the pores on the substrate 10. In addition, a plurality of gaps will also be formed among the hard particles due to the large particle diameter of the hard particles, and these gaps can also play a role of penetration and storage of the electrolyte and the gas, moreover, when formed, the hard particle layer 20 can also block the burrs and prevent the burrs from penetrating due to the high structural strength of the hard particles. In the present embodiment, the hard particle can adopt the ceramic particle with high hardness and light weight, such as at least one of $Al_2O_3$, $ZrO_2$, boehmite, $MgO$, $SiO_2$, $TiO_2$, $CaCO_3$, $CaO$, etc. The thickness of the hard particle layer 20 can be selected within the range of 1~5 mm according to the difference of the adopted type of the hard particle and the adhering position.

Since the hard particle layer 20 is composed of numerous hard particles, these hard particles need to be bonded together through a binder, and a dispersant can also be added for dispersion if necessary. At this time, there could be two different manners of arrangement.

In the first manner, firstly adhering the hard particles onto the surface of the substrate 10 by a binder, at this time the surface of the substrate 10 can be individual coated with a layer of binder in advance, and then covering the surface of the binder with the hard particle layer 20, or directly mixing the hard particles with the binder and the dispersant together, then coating the mixture on the surface of one side of the substrate 10, adhering the hard particles together and in the meantime adhering the hard particle layer 20 and the substrate 10 together by the tackiness of the binder. Subsequently, arranging a layer of adhesive layer 30 on the formed hard particle layer 20, and the adhesive layer 30 is used for bonding with the portion that needs insulation.

In the second manner, the hard particles 50 are directly mixed with the colloid component 40 in the adhesive layer 30. In this manner, a complex layer of the hard particles 50 mixed with the colloid component 40 of the adhesive layer 30 and the adhesive layer 30 can be directly formed on the surface of one side of the substrate 10. This complex layer can also be bonded with the portion that needs insulation.

In the above-mentioned two manners, the adhesive layer 30 can have no cohesive force at normal temperature, but generate cohesive force by changing the state of the colloid component (for example changing to a viscous flow state) in the adhesive layer 30 by hot and cold pressing or other processes and fix the hard particle layer 20 or be bonded with the bare cell. Of course, the adhesive layer 30 can also have initial cohesive force of 0.1~10N/25 mm, and most preferably 0.8~4N/25 mm.

The adhesive layer 30 has good permeability of gas and liquid, however, it will be subjected to long-term soaking inside the Li-ion battery, and therefore it is readily subjected to the influence of the electrochemical reaction in the interior of the cell, which may cause oxidation failure. For this situation, the material adopted by the adhesive layer 30 in the present embodiment can select polyvinylidene fluoride (PVDF), vinylidene fluoride-hexafluoropropylene copolymer, polyamide, polyacrylonitrile, polyacrylate, polyacrylic acid, polyacrylic acid salt, sodium carboxymethyl cellulose, styrene-butadiene polymer, polyvinyl pyrrolidone or poly(methyl methacrylate) (PMMA), etc., which is a colloid material. These materials all have greater anti-oxidation performance, which can maintain much more stable chemical performance under the Li-ion battery environment. Embodiment 2 of the present application provides a Li-ion battery, including a positive electrode, a negative electrode and a diaphragm arranged between the positive electrode and the negative electrode, and an electrolyte. The positive electrode, the negative electrode and the diaphragm constitute a bare cell through coiling or stacking, and "area to be insulated" in the bare cell is adhered with the insulating tape provided by Embodiment 1. The above referred "area to be insulated" includes the welding area of the tab, the boundary area of the cathode coating material area and the non-coating material area, other areas of the cathode current collector corresponding to the anode coating material area and the area corresponding to the cross section, etc.

The technical effect of the present application is described in detail with the following experimental data.

1. Performance Analysis of the Insulating Tape:
(1) Preparation of the Insulating Tape:
Preparing the experiment groups and the comparative group of the insulating tape, and the specific parameters of each group are shown in Table 1.

TABLE 1

| | Program | | | | | | |
|---|---|---|---|---|---|---|---|
| | Thickness of substrate/μm | Thickness of hard particle layer/μm | Thickness of adhesive particle layer/μm | Complex thickness of hard particle layer and adhesive layer/μm Testing method | Overall thickness of insulating tape/μm | Material of substrate | Microporous structure |
| | micrometer method | micrometer method | micrometer method | micrometer method | micrometer method | / | / |
| Comparative group | 16 | / | 4 | / | 20 | PET | Imperforate |
| Experiment group 1 | 16 | 1 | 5 | / | 20 | PE | Porous membrane structure |
| Experiment group 2 | 16 | 1 | 3 | / | 20 | PE | Porous membrane structure |
| Experiment group 3 | 16 | 1 | 3 | 4 | 20 | PE | Porous membrane structure |
| Experiment group 4 | 16 | 1 | 3 | / | 20 | PE | Porous membrane structure |
| Experiment group 5 | 7 | 1 | 3 | / | 11 | PE | Porous membrane structure |
| Experiment group 6 | 7 | 1 | 3 | / | 11 | PE | Porous membrane structure |
| Experiment group 7 | 7 | 1 | 3 | / | 11 | PP | Porous membrane structure |
| Experiment group 8 | 7 | 1 | 3 | / | 11 | PI | Porous membrane structure |
| Experiment group 9 | 7 | 1 | 3 | / | 11 | PE | Porous membrane structure |
| Experiment group 10 | 7 | 1 | 3 | / | 11 | PE | Porous membrane structure |
| Experiment group 11 | 7 | 1 | 3 | / | 11 | PE | Porous membrane structure |
| Experiment group 12 | 12 | 1 | 3 | / | 16 | PE | Porous membrane structure |
| Experiment group 13 | 12 | 3 | 3 | / | 18 | PE | Porous membrane structure |
| Experiment group 14 | 17 | 3 | 3 | / | 20 | PE | Porous membrane structure |
| Experiment group 15 | 7 | / | / | 2 | 9 | PE | Porous membrane structure |
| Experiment group 16 | 7 | / | / | 4 | 11 | PE | Porous membrane structure |
| Experiment group 17 | 7 | / | / | 8 | 13 | PE | Porous membrane structure |
| Experiment group 18 | 3 | 1 | 3 | / | 3 | PE | Porous membrane structure |
| Experiment group 19 | 3 | 1 | 3 | / | ? | PE | Porous membrane structure |

TABLE 1-continued

| | | | | | | | |
|---|---|---|---|---|---|---|---|
| Experiment group 20 | 3 | 1 | 6 | / | 10 | PE | Porous membrane structure |
| Experiment group 21 | ? | 1 | 3 | / | 11 | PP | Non-woven structure |
| Experiment group 22 | ? | 1 | 3 | / | 11 | PP | Sponge structure |

| | Program | | | | |
|---|---|---|---|---|---|
| | Porosity of substrate | Material of hard particle | Colloid of adhesive layer | Porosity of tape after being made into cell | Overall thickness of tape after being made into cell/μm |
| Testing method | volume method | / | / | volume method | micrometer method |
| Comparative group | / | / | PMMA | 9 | 28 |
| Experiment group 1 | 45% | $Al_2O_3$ | PMMA | 37.9% | 20 |
| Experiment group 2 | 45% | $Al_2O_3$ | PMMA | 36.0% | 20 |
| Experiment group 3 | 45% | $Al_2O_3$ | Vinylidene fluoride-hexafluoro-propylene copolymer | 44.0% | 17 |
| Experiment group 4 | 45% | $Al_2O_3$ | PVDF | 41.0% | 17 |
| Experiment group 5 | 45% | boehmite | PVDF | 41.0% | 8 |
| Experiment group 6 | 45% | $SiO_2$ | PVDF | 41.8% | 8 |
| Experiment group 7 | 45% | $Al_2O_3$ | PVDF | 42.7% | 8 |
| Experiment group 8 | 45% | $Al_2O_3$ | PVDF | 43.6% | 8 |
| Experiment group 9 | 45% | $Al_2O_3$ | PVDF | 41.3% | 8 |
| Experiment group 10 | 55% | $Al_2O_3$ | PVDF | 47.7% | 8 |
| Experiment group 11 | 35% | $Al_2O_3$ | PVDF | 35.0% | 8 |
| Experiment group 12 | 45% | $Al_2O_3$ | PVDF | 42.5% | 13 |
| Experiment group 13 | 45% | $Al_2O_3$ | PVDF | 40.0% | 15 |
| Experiment group 14 | 45% | $Al_2O_3$ | PVDF | 38.0% | 17 |
| Experiment group 15 | 45% | $Al_2O_3$ | PVDF | 41.6% | 9 |
| Experiment group 16 | 45% | $Al_2O_3$ | PVDF | 39.5% | 10 |
| Experiment group 17 | 45% | $Al_2O_3$ | PVDF | 38.0% | 17 |
| Experiment group 18 | 45% | $Al_2O_3$ | PVDF | 39.0% | 4 |
| Experiment group 19 | 45% | $Al_2O_3$ | PVDF | 39.2% | 5 |
| Experiment group 20 | 45% | $Al_2O_3$ | PVDF | 39.5% | 6 |
| Experiment group 21 | 45% | $Al_2O_3$ | PVDF | 40.0% | 7.8 |
| Experiment group 22 | 45% | $Al_2O_3$ | PVDF | 38.5% | 7 |

Testing Method:

1. Micrometer method: measuring 10 sites using a micrometer with a round head of 5 mm diameter, taking the average value (rounding off to 1 μm).

2. Volume method: cutting out a sample with an area of 100 mm*100 mm, weighing M, obtaining volume V according to the thickness t measured by the micrometer, calculating out the apparent density $\rho_1$, its porosity is $(1-\rho_1/\rho_{true})$, in which $\rho_{true}$ is the true density measured by a true densimeter.

(2) Performance Test of the Insulating Tape

Testing performance of each experiment group and comparative group, and the testing results are shown in Table 2.

TABLE 2

| | Program | | |
|---|---|---|---|
| | Peeling force/ N/25 mm | Anti-oxidization performance Testing method | Air-permeability |
| | Tensile testing method | Storing at high temperature and high voltage | Air-permeability method |
| Comparative group | 2.9 | Blackened | / |
| Experiment group 1 | 2.8 | Blackened | 284.0 |
| Experiment group 2 | 2.3 | Blackened | 183.0 |
| Experiment group 3 | 1.8 | Normal | 79.6 |
| Experiment group 4 | 1.7 | Normal | 79.6 |
| Experiment group 5 | 1.6 | Normal | 86.5 |
| Experiment group 6 | 1.7 | Normal | 85.2 |
| Experiment group 7 | 1.7 | Normal | 80.5 |
| Experiment group 8 | 1.6 | Normal | 76.4 |
| Experiment group 9 | 1.6 | Normal | 87.4 |
| Experiment group 10 | 1.7 | Normal | 56.9 |
| Experiment group 11 | 1.6 | Normal | 118.0 |
| Experiment group 12 | 1.6 | Normal | 82.0 |
| Experiment group 13 | 1.4 | Normal | 94.0 |
| Experiment group 14 | 1.3 | Normal | 103.6 |
| Experiment group 15 | 0.8 | Normal | 86.0 |
| Experiment group 16 | 1.2 | Normal | 96.1 |
| Experiment group 17 | 1.5 | Normal | 103.2 |
| Experiment group 18 | 0.6 | Normal | 98.8 |
| Experiment group 19 | 1.5 | Normal | 97.4 |
| Experiment group 20 | 2.8 | Normal | 96.4 |
| Experiment group 21 | 0.8 | Normal | 95.0 |
| Experiment group 22 | 1.2 | Normal | 100.0 |

Testing Method:

1. Tensile testing method: adhering the tape to the an Al current collector, in a direction of 180 degree, peeling at a rate of 10 mm/min, so as to obtain the average peeling force.

2. Storing at high temperature and high voltage: charging the cell with 0.7 C to 4.4V, then to 0.02 C with constant voltage, baking for 8 hours in an oven at 85° C., and then disassembling the cell for observing the state and color of the tape.

3. Air-permeability method: testing with an U.S. made Gurley Densometers, the air volume is 50 ml, recording the time for the given volume of air to flow through the testing material.

(3) Performance Analysis of the Insulating Tape:

Comparative group: adopting PMMA design, with non-microporous structure for transferring the lithium ions, which is readily oxidized (blackened) under high temperature and high voltage.

It can be found by comparing the experiment groups 1, 2, 3 and 4 that: when the substrate is replaced by PE material and coated with the hard particle layer (Experiment group 1), the formed microporous structure can transfer lithium ions, however, PMMA will block most of the micropores, which results in a higher air-permeability value, and the capacity increase of the cell is not obvious, the blackening problem cannot be avoided; after the glue is replaced by polymethylacrylic acid (Experiment group 2), the pore blocking situation is improved; the capacity increases, while there is still oxidization problem. After the glue is replaced by "vinylidene fluoride-hexafluoropropylene copolymer" (Experiment group 3) and "PVDF" (Experiment group 4), the pore blocking situation is obviously improved, the capacity of the adhered cathode area is basically the same as the non-adhered cathode area and there is no oxidization problem.

It can be found by comparing Experiment groups 4, 9, 12 and 19 that: under different thicknesses of the substrate of 16 μm (Experiment group 4), 7 μm (Experiment group 9), 12 μm (Experiment group 12) and 3 μm (Experiment group 19), and with the same process, the increase of the ratio of the coating material in the formed tape causes negative influence on the porosity, further influences the porosity and the capacity. The same mechanism is also suitable for the experiment situation of Experiment groups 15, 16 and 17 (comparing different thicknesses of the complex layer coating process), and Experiment groups 12, 13 and 14 (comparing different coating thicknesses of the hard material).

It can be found by comparing Experiment groups 5, 6 and 9 that: under different hard materials of boehmite (Experiment group 5), $SiO_2$ (Experiment group 6) and $Al_2O_3$ (Experiment group 9), with the same process, the influence of the hard material on the formed tape is not obvious, their capacity is at the same level.

It can be found by comparing Experiment groups 7, 8 and 9 that: under different substrates of PP (Experiment group 7), PI (Experiment group 8) and PE (Experiment group 9), with the same process, the higher melting point of the material leads to higher porosity of the formed tape, i.e. better maintenance of the porosity and higher capacity.

It can be found by comparing Experiment groups 9, 10 and 11 that: under different substrate porosity of 35% (Experiment group 11), 45% (Experiment group 9) and 55% (Experiment group 10), with the same process, higher porosity of the substrate leads to higher porosity of the formed tape and higher capacity.

It can be found by comparing Experiment groups 9 and 16 that: under different coating processes of two layers (Experiment group 9) and a complex layer (Experiment group 16), with the same process, compared with the two-layer structure, the complex layer has negative influence on the porosity of the formed tape, the capacity decreases, while there is an absolute advantage in the process cost.

It can be found by comparing Experiment groups 18, 19 and 20 that: under PVDF adhesive layers of different thicknesses of 1 μm (Experiment group 18), 3 μm (Experiment group 19) and 6 μm (Experiment group 20), with the same process, the influence of the thickness of the PVDF adhesive layer on the formed tape is not obvious, their capacity is at the same level; since the PVDF glue is incorporated into the interior of the cell electrodes after the cell is formed by the hot pressing process, the influence on the porosity of the tape is not obvious, and the thickness of the tape coated with the PVDF glue coating in other groups will reduce after the tape is formed into the cell according to this mechanism.

It can be found by comparing Experiment groups 7, 21 and 22 that: when the substrate is of a non-woven fabric structure or a sponge structure, due to small pores of the non-woven fabrics and the sponge, the tape will be compressed after being adhered to the cell, and further causes the porosity of the substrate of the tape become smaller, thus influence the air-permeability of the tape; however, due to the compression of the tape, the occupied space will be smaller than the porous membrane, therefore the capacity will be higher than that of the porous membrane.

2. Performance Analysis of the Li-Ion Battery:

(1) Preparation of the Positive Electrode:

Evenly dispersing the positive electrode active material, the conductive agent (conductive carbon black Super-P) and the binder (polyvinylidene fluoride, abbreviated as PVDF, the mass percentage of polyvinylidene fluoride in the binder is 10%) in the solvent N-methyl pyrrolidone (abbreviated as NMP), so as to form positive electrode slurry. The solid content of the positive electrode slurry is 75%, the solid component includes 96 wt % lithium cobaltate, 2% PVDF and 2 wt % conductive carbon black Super-P. Uniformly coating the positive electrode slurry on the positive electrode current collector aluminum foil with a thickness of 16 μm, the coating amount is 0.018 g/cm². Subsequently, drying at 85° C., cold pressing, cutting edge, slitting, stripping, and then drying for 4 h in vacuum at 85° C., welding electrode tabs, so as to obtain the positive electrode.

(2) Preparation of the Negative Electrode:

Evenly mixing the negative electrode active material artificial graphite, the conductive agent conductive carbon black Super-P and the sodium carboxymethyl cellulose thickener (abbreviated as CMC, the mass percentage of sodium carboxymethyl cellulose is 1.5%), the binder styrene-butadiene rubber (abbreviated as SBR, the mass percentage of styrene-butadiene rubber in the binder is 50%) in deionized water, so as to form negative electrode slurry. The solid content of the negative electrode slurry is 50 wt %, the solid component includes 96.5 wt % artificial graphite, 1.0 wt % conductive carbon black Super-P, 1.0 wt % CMC and 1.5 wt % SBR. Uniformly coating the negative electrode slurry on a negative electrode current collector copper foil with a thickness of 12 μm, the coating amount is 0.0089 g/cm², subsequently, drying at 85° C., cold pressing, cutting edge, slitting, stripping, and then drying for 4 h in vacuum at 110° C., welding electrode tabs, so as to obtain the negative electrode.

(3) Preparation of the Diaphragm:

A polypropylene thin film of 12 μm is used as the diaphragm.

(4) Adhering the Insulating Tape:

Successively adhering the insulating tapes provided by Experiment groups and Comparative group to the electrode tab welding area of the positive electrode and the negative electrode, the boundary area of the cathode coating material area and the non-coating material area, other areas of the cathode current collector corresponding to the anode coating material area and the area corresponding to the cross section, etc.

(5) Preparation of the Li-Ion Battery:

Stacking the positive electrode, the diaphragm and the negative electrode in sequence, in which the diaphragm arranged between the positive electrode and the negative electrode plays a role of separating, then coiling into a square bare cell with a thickness of 3 mm, a width of 60 mm and a length of 130 mm. Packaging the bare cell into an aluminum foil packaging bag, baking for 10 h in vacuum at 75° C., injecting electrolyte, vacuum packaging, standby for 24 h, and then charging to 4.4V with 0.1 C (160 mA) constant current, charging until the current decreases to 0.05 C (80 mA) with 4.4V constant voltage, and then discharging to 3.0V with 0.1 C (160 mA) constant current, repeating the charging and discharging for two times, finally charging to 3.8V with 0.1 C (160 mA) constant current, so as to finish the preparation of the Li-ion battery.

(6) Testing Capacity of the Cell for the Li-Ion Battery in Each Group:

The relationship between the number of the obtained Li-ion battery and the insulating tape, and the capacity of the cell are shown in Table 3.

TABLE 3

| Li-ion battery No. | Group name of adopted insulating tape | K value of cell/mV/h | Average capacity value of cell/mAh |
|---|---|---|---|
| DC1 | Comparative group | 0.024 | 1684 |
| DC2 | Experiment group 1 | 0.022 | 1688 |
| DC3 | Experiment group 2 | 0.023 | 1695 |
| DC4 | Experiment group 3 | 0.021 | 1720 |
| DC5 | Experiment group 4 | 0.024 | 1721 |
| DC6 | Experiment group 5 | 0.023 | 1716 |
| DC7 | Experiment group 6 | 0.022 | 1718 |
| DC8 | Experiment group 7 | 0.024 | 1719 |
| DC9 | Experiment group 8 | 0.023 | 1722 |
| DC10 | Experiment group 9 | 0.022 | 1716 |
| DC11 | Experiment group 10 | 0.021 | 1722 |
| DC12 | Experiment group 11 | 0.022 | 1698 |
| DC13 | Experiment group 12 | 0.023 | 1717 |
| DC14 | Experiment group 13 | 0.022 | 1710 |
| DC15 | Experiment group 14 | 0.021 | 1707 |
| DC16 | Experiment group 15 | 0.023 | 1716 |
| DC17 | Experiment group 16 | 0.023 | 1710 |
| DC18 | Experiment group 17 | 0.022 | 1705 |
| DC19 | Experiment group 18 | 0.024 | 1708 |
| DC20 | Experiment group 19 | 0.023 | 1709 |
| DC21 | Experiment group 20 | 0.022 | 1710 |
| DC22 | Experiment group 21 | 0.025 | 1720 |
| DC23 | Experiment group 22 | 0.026 | 1725 |

Testing Method:

1. Testing of K value: standby for 1 day at normal temperature, testing voltage V1, testing time h1, standby for 2 days, testing voltage V2, testing time h2, K value=(V1−V2)/(h2−h1), with a unit of mV/h. The anti-burr penetrating performance of the tape in the cell is indirectly characterized by the self-discharge rate.

Testing of capacity: at 25° C., charging the cell to 4.4 V with 0.7 C, to 0.02 C with constant voltage, standby for 5 min, discharging to 3.0V with 0.2 C, so as to obtain the capacity. Whether the active cathode area covered by the tape can be normally charged and discharge is indirectly characterized by the discharging capacity.

(7) Analysis of the Cell Performance:

It can be found by comparing DC1 and DC2-DC23 that: the K value of the cell has no obvious change, while the capacity of the cell has significant increase, which shows that the insulating tapes of Comparative group and Experiment groups 1-22 can maintain good anti-burr penetrating performance and meanwhile effectively improve the energy density of the cell. However, compared with the porous membrane structure, the tapes of sponge and non-woven structure will increase the K value of the cell.

The above are merely preferred embodiments of the present application, which are not used to limit the present application. The present application can have various modification and variations for the person skilled in the art. Any modification, equivalent replacement and improvement, etc. within the spirit and principle of the present application shall fall into the protection scope of the present application.

What is claimed is:

1. A Li-ion battery, comprising:
a bare cell comprising a positive electrode, a negative electrode, a diaphragm disposed between the positive electrode and the negative electrode, the positive electrode, the negative electrode, and the diaphragm constituting the bare cell through coiling or stacking; and
an insulating tape bonded to an area in the bare cell to be insulated, wherein the area in the bare cell to be insulated comprises welding areas of tabs of the positive electrode or the negative electrode, a boundary area of a coating material area and a non-coating material area of the positive electrode or the negative electrode, and an area of a positive electrode current collector corresponding to the coating material area of the negative electrode, wherein the insulating tape comprises a substrate and a complex layer, wherein the complex layer comprises an adhesive layer and hard particles directly mixed with a colloid component of the adhesive layer, wherein the substrate is of a microporous structure, and a particle diameter of each of the hard particles is greater than a pore diameter of the microporous structure of the substrate.

2. The Li-ion battery according to claim 1, wherein the microporous structure is a porous membrane structure, a non-woven fabric structure or a sponge structure.

3. The Li-ion battery according to claim 2, wherein a porosity of the microporous structure is 35-55%.

4. The Li-ion battery according to claim 1, wherein a thickness of the substrate is 3-16 μm.

5. The Li-ion battery according to claim 1, wherein each of the hard particles is a ceramic particle.

6. The Li-ion battery according to claim 1, wherein a material of the adhesive layer is polyvinylidene fluoride, vinylidene fluoride-hexafluoropropylene copolymer, polyamide, polyacrylonitrile, polyacrylate, polyacrylic acid, polyacrylic acid salt, sodium carboxymethyl cellulose, styrene-butadiene polymer, polyvinyl pyrrolidone or poly(methyl methacrylate).

7. The Li-ion battery according to claim 1, wherein a material of the substrate is one selected from PE, PP and PI or a composite formed by at least two of PE, PP and PI.

8. The Li-ion battery according to claim 1, wherein the initial cohesive force ranges from 0.8 N/25 mm to 4N/25 mm.

* * * * *